Oct. 21, 1941.    V. J. PHILLIPS    2,260,232
WRITING MACHINE
Filed Sept. 1, 1938
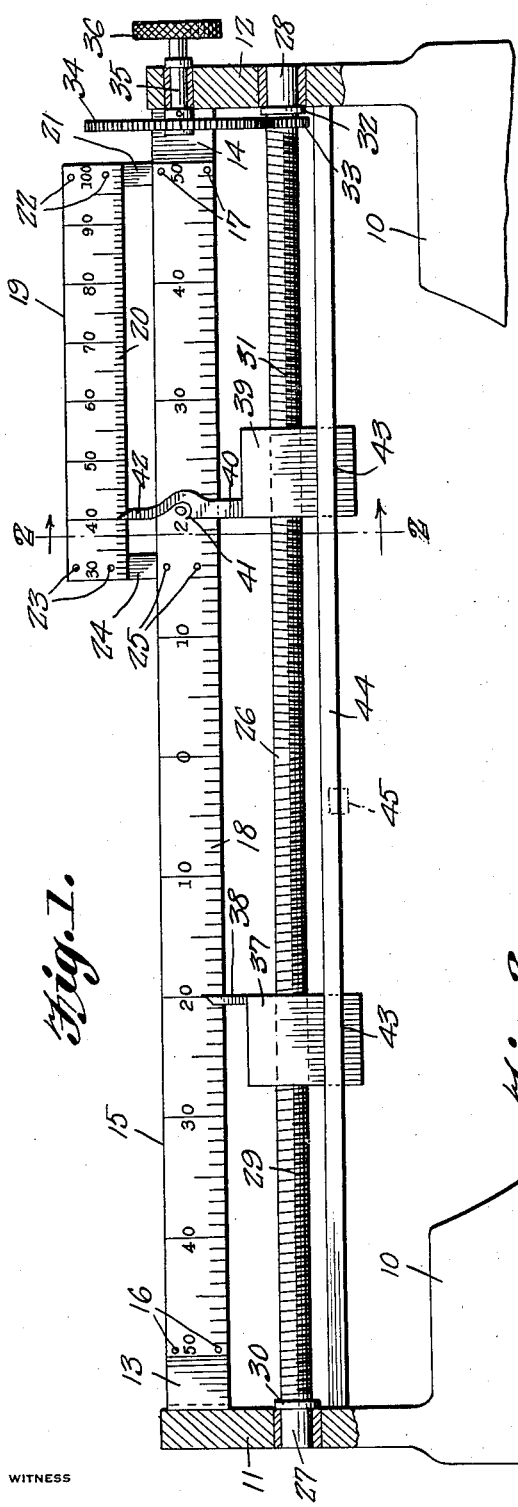
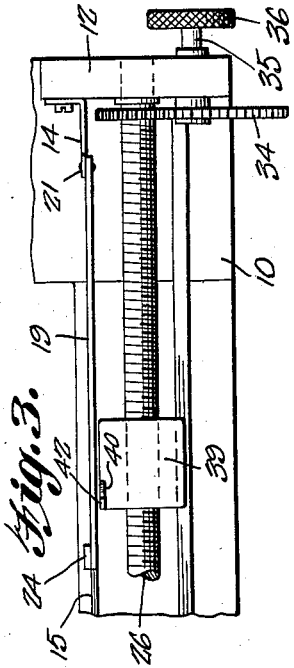
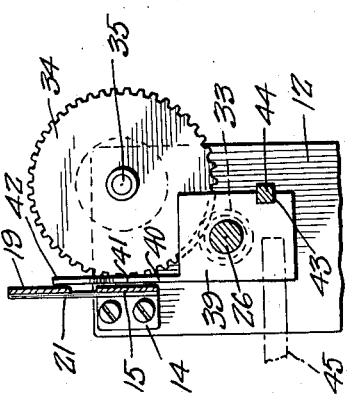
Valentine J. Phillips, INVENTOR
BY Victor J. Evans & Co.
ATTORNEYS Patented Oct. 21, 1941

2,260,232

UNITED STATES PATENT OFFICE 2,260,232

WRITING MACHINE

Valentine James Phillips, Johnstown, Pa.

Application September 1, 1938, Serial No. 228,033

3 Claims. (Cl. 197—194)

This invention relates to typewriting machines and has more particularly to do with the relative location of the sheet of paper in an ordinary typewriting machine or the like and also with correlated means for determining marginal spaces at the beginning and ending of the lines inscribed on a sheet of a given width.

The invention has for one of its objects to provide a simple yet practical and efficient means of marginal control which is readily applied to the ordinary typewriting machines of various makes, either upon the main body and frame or the carriage, as the case may be, within view of the the operator and in convenient reach for manipulation and adjustment.

Another object is to provide for an equalized setting of the marginal control stops.

With the foregoing and other objects and advantages to be attained, the invention consists in a novel general assembly and in the particular parts and combinations and arrangements of parts thereof as hereinafter described and set forth in the appended claims, reference being had to the accompanying drawing illustrating a practical adaptation of the invention and in which:

Figure 1 is a view illustrating a marginal control means as applied to the body frame of an ordinary typewriting machine;

Figure 2 is a cross sectional view taken on or about the line 2—2 of Figure 1; and Figure 3 is a fragmentary top plan view of the right hand portion of the assembly shown in Figure 1.

Referring now to the drawing, the numeral 10 designates, generally, the main body frame of an ordinary typewriting machine having upright extensions 11, 12, at opposite sides thereof. On the inner side of the upright portion 11 of the frame 10 is a bracket member 13, while on the opposite upright member 12 is another bracket member 14, said brackets having the opposite end portions of an elongated flat bar 15 attached thereto as at 16, 17, respectively, said bar being marked with a scale 18 corresponding in overall length to the maximum stroke-line capacity of the typewriter. For example, in the particular illustration in Figure 1, it is for a machine of ten inch width sheet capacity. This scale which is the margin indicator scale is marked off into ten main divisions which are again marked off into ten subdivisions, each corresponding to a type impression stroke of the machine, the middle line of the scale coinciding with the centre of the machine and the scale extending equally on opposite sides of said middle line, said middle line being designated by the character 0 and the main division lines on opposite sides thereof being sequentially numbered 10 and multiples thereof to the opposite ends of the scale.

Mounted above the right hand portion of the bar 15 is a supplemental bar 19 which is marked with a special ratio scale 20, the outer end of which coincides with the end of the scale 18 while its inner end coincides with one of the subdivisions of said scale 18 at any desired point to the right of the middle or the 0 mark of the said scale 18. In the illustration in Figure 1 the inner end of the scale 19 coincides with the fifteenth stroke indication of the scale 18 to the right of the 0 mark. As shown, said bar 19 carrying the scale 20 is mounted at its outer end on an upward extension 21 of the bracket member 14, as at 22, while the inner end of said member 19 is mounted, as at 23, on a vertical supporting piece 24 which is attached to the bar 15, as at 25.

The ratio scale 20 is marked off into main spaces corresponding to one half of the main spaces of the scale 18, or, equal to five of the subdivisions of said scale 18, the main spaces of said ratio scale 10 being proportionately subdivided into the same number of subdivisions corresponding to those of the main margin-indicator scale 18.

Extending in parallel relation to the bar 15 carrying the indicator scale 18 as just above described is a shaft 26 which is journalled at one end in the frame member 11, as at 27, and at its opposite end in the frame member 12, as at 28, said shaft 26 having right hand screw threads formed on one half thereof as at 29, said threads 29 extending from the middle of the shaft to the thrust collar 30 provided on the shaft adjacent the bearing end portion 27 thereof, while on the other half of the shaft left hand threads 31 are formed which extend from the middle of the shaft to a point near a collar 32 provided on the shaft adjacent its bearing end 28. Secured on the shaft 26 adjacent the collar 32 is a pinion 33 which meshes with gear 34 fixed on the inner end of a spindle 35 which is journalled in frame member 12 and provided at its outer end with a manipulating knob 36.

Mounted on the screw threaded portion 29 of the shaft 26 is a block 37 carrying a pointer 38 which extends in indicating relation to the portion of the scale 18 on the bar 15 to the left of the middle or 0 line of the scale, while on the screw threaded portion 31 of said shaft is a similar block 39 carrying a double pointer 40, one portion 41 of which cooperates with the portion of the scale 18 to the right of the 0 line and another portion 42 of which cooperates with the scale 20 on the supplemental member 19 above the bar 15 carrying said scale 18.

The blocks 37 and 39 are provided with correspondingly screw-threaded bores fitting the respective screw-threaded portions 29 and 31 of the shaft 26 so that by holding the blocks against rotation they are moved endwise of the shaft 26 when the latter is rotated in either direction, the rotation of the shaft being effected with considerable speed according to the ratio of the driving gears 33 and 34 provided between the shaft and the actuating spindle 35 on which the knob 36 is provided. As a practical means for holding the blocks 37 and 39 against rotation on the shaft 26, the blocks are each provided at one side with a groove 43 which slidably fits a guide rod 44 extending parallel with the shaft 26 and fixedly mounted at its opposite ends in the side members 11 and 12 of the machine frame, said rod being preferably of square cross-section, as shown, and the grooves correspondingly shaped. The blocks 37 and 39 constitute stops for controlling the marginal spaces at the ends of the typed lines on the paper at opposite sides of the sheet, said marginal spaces being equal if the sheet is placed centrally in the machine and so guided in the feeding thereof during the typing operation, because said blocks 37 and 39 are adjusted simultaneously toward and from each other at the same speed and with the same length of travel and with the same effect, whether the blocks and their associated parts are mounted on the frame of the machine or the carriage, the only difference being that when the parts are mounted on the frame, as shown in the accompanying drawing, the blocks 37 and 39 are engaged by a projection such as the usual stoppage finger or member 45 on the carriage, which finger or member 45 operates between said blocks 37 and 39 during the reciprocation of the carriage in the typing operation, while in cases where the means of the present invention are mounted on the carriage the finger or member 45 or its equivalent is obviously mounted on the frame of the machine.

Inasmuch as the setting of the marginal stop blocks 37 and 39 is worked out from the centre of the machine and in equalized relation with the principal object of producing marginal spaces that are uniformly alike on opposite sides of the sheet of paper being typed, it is essential that correlated means be provided for centering the sheet as it is fed through the carriage. To this end, therefore, special gauging means is preferably provided on the paper supporting shelf or table, usually provided on the carriage of the ordinary typewriting machine adjacent the platen, or, as far as the present invention is concerned, this special gauging means may be provided in any other convenient location in the region where the paper is fed into the machine.

Now, considering that the sheet of paper inserted in the machine is of a six inch width, and it is desired to have the body of the typing on the sheet within an area four inches wide and marginal spaces of one inch on each side of the typed matter the operator, while watching the special ratio scale 20 located above the main scale 18, will turn the knob 36 and thereby effect the rotation of the shaft 26, which rotation takes place with relative rapidity due to the ratio of the driving gears between the spindle of the knob and said shaft 26, so as to thereby move the marginal control block 39 to bring the upper point 42 thereof into registration with the division line of the scale 20 having character 40 marked thereon, at which time, of course, the lower point 41 registers with the marking on the main scale 18 to the right of the 0 mark and having the designating character 20. Simultaneously with the setting of the block 39 as just described, the opposite block 37 has been moved into a position where its point 38 registers with the division line of the scale 18 marked 20 to the left of the 0 mark. The two blocks 37 and 39 are thus spaced four inches apart, and are also spaced 40 type-actuating strokes apart as indicated by the character 40 on the special ratio scale 20 and also by adding the two indicating characters 20 together on the scale 18.

In accordance with the particular illustration in Figure 1, the two blocks 37 and 39 may be set in close contact with each other with their respective points coinciding with the 0 mark division of the scale 18 or spread apart, at will, until their respective pointers coincide with division marks near the opposite ends of the scale, but, in practice, not often, if ever, will it be necessary to set the blocks closer than three inches apart or the equivalent of a thirty stroke line of typing. Hence, the scale 20 terminates with its inner end coinciding with the marking on the scale 18 to the right of the 0 mark which is indicative of a distance of one and one half inches or equivalent to fifteen type actuating strokes. However, the particular dimensions and figures hereinabove given are by way of illustration only, as it is obvious that the same may be varied considerably in different adaptations of the invention.

In the ordinary typewriting machine, a margin release key may be provided to permit the arresting finger or member 45 on the carriage to pass the margin control block 37, if need be, or, in cases where the member 45 or its equivalent is located on the frame of the machine and the margin controlling means is mounted on the carriage, said release key will operate to permit the other margin control block 39 to pass said stoppage member or finger 45.

The invention comprehends broadly the method of utilizing correlated paper centering and marginal controlling means substantially as herein set forth and while the illustration in the drawing embodies a practical adaptation of the invention it is obvious that the structural parts and particular location thereof on the typewriting machine or the like admits of considerable modification within the spirit of the invention as defined by the appended claims. The invention, therefore, is not limited to the specific construction and arrangement shown in the accompanying drawing.

What is claimed is:

1. In a typewriting machine or the like, means for determining the margins on opposite sides of the body of typed matter impressed on a sheet passed through the machine in the typing operation, said means comprising a main scale of a length corresponding to the maximum length of typed line capacity of the machine, said scale being divided at its middle with a zero indication at the line of division and being subdivided on opposite sides of such line in like equal sections numbered progressively in opposite directions from the zero indication in multiples of individual indicated spaces therein each corresponding to a typing space, an auxiliary ratio scale fixedly mounted adjacent and parallel with and in direct readable correlation to said main scale at one side of the medial zero line of division and being divided into sections in the ratio of 2 to 1 with respect to the several divisions of the main scale, said auxiliary scale terminating with its outer end laterally coincident with the adjacent end of the main scale and having its cardinal lines of division coincidently alined alternately with the cardinal lines and intermediate sub-cardinal lines of said main scale, the cardinal lines of said auxiliary scale being marked progressively with multiple numbers double the numbers which apply directly to the coordinated lines of division, both cardinal and sub-cardinal, on the main scale, a pair of opposed stop members mounted for movement in a plane parallel with the main scale and being respectively located equidistant on opposite sides of the medial zero line of division of said scale and having a stoppage element of the machine projected therebetween for intercontact therewith to limit the operative travel of the carriage of the machine in opposite directions, said stop members each having a pointer extended in the same indicating relation to said main scale and the stop member at the side of the zero line of the main scale where the auxiliary ratio scale is provided having a coordinated auxiliary pointer alined with and extended beyond its pointer which is in indicating relation to the main scale and into indicating relation to said auxiliary ratio scale whereby to indicate on the latter the sum of the indications of the first mentioned pointers of the two stop members on the main scale, and means for simultaneously moving said stop members in equalized relation toward and from each other and for holding them in set position.

2. In a typewriting machine or the like, means for determining the margins on opposite sides of the body of typed matter impressed on a sheet passed through the machine in the typing operation, said means comprising a main scale of a length corresponding to the maximum length of typed line capacity of the machine, said scale being divided at its middle with a zero indication at the line of division and being subdivided on opposite sides of such line in like equal sections numbered progressively in opposite directions from the zero indication in multiples of individual indicated spaces therein each corresponding to a typing space, an auxiliary ratio scale fixedly mounted adjacent and parallel with and in direct readable correlation to said main scale at one side of the medial zero line of division and being divided into sections in the ratio of 2 to 1 with respect to the several divisions of the main scale, said auxiliary scale terminating with its outer end laterally coincident with the adjacent end of the main scale and having its cardinal lines of division coincidently alined alternately with the cardinal lines and intermediate sub-cardinal lines of said main scale, the cardinal lines of said auxiliary scale being marked progressively with multiple numbers double the numbers which apply directly to the coordinated lines of division, both cardinal and sub-cardinal, on the main scale, a rotatable screw shaft extending parallel with said main scale, said screw shaft having right-hand threads at one side of a center thereof coincident with the zero line of division of said main scale and left-hand threads at the opposite side of said center, opposed stop members located equidistant on opposite sides of the zero line of division of said main scale, one of said stop members being in counterpart threaded engagement with the right-hand-threaded portion of said screw shaft and the other stop member likewise engaging the left-hand-threaded portion of said shaft, whereby, when said shaft is rotated said stop members are moved simultaneously in equalized relation either toward or from each other according to the direction of shaft rotation, said stop members each having a pointer extended in the same indicating relation to said main scale and the stop member at the side of the zero line of division of the main scale where the auxiliary ratio scale is provided having a coordinated auxiliary pointer extended beyond its pointer which is in indicating relation to the main scale and into indicating relation to said auxiliary ratio scale whereby to indicate on the latter scale the sum of the indications of the first mentioned pointers of the two stop members on the main scale, manually operable means for rotating said screw shaft in either direction, at will, and means for guiding said stop members in their travel on said screw shaft and for maintaining them with their pointers respectively in indicating relation to said main and auxiliary scales.

3. The combination with a typewriting machine, of a main scale of a length corresponding to the maximum length of typed line capacity of the machine, said scale being divided at the center with a zero indication at the line of division and subdivided on each side thereof in equal sections numbered progressively in opposite directions and each corresponding to a typing space, an auxiliary ratio scale mounted parallel with the main scale at one side of the zero line and divided into sections in the ratio of two to one with respect to the divisions of the main scale, a pair of opposed stop members mounted for movement in a plane parallel with the main scale and located an equal distance on opposite sides of the zero line, a bar passing through the stop members having right and left hand threaded connection therewith for moving the same to and from each other at the same speed, a pointer carried by each of the stop members and extending over the main scale, and a second pointer carried by the pointer of one of the stop members and having an outwardly and inwardly curved portion provided with a pointed end in the same transverse plane with the pointer of the main scale and extending over the auxiliary scale.

VALENTINE JAMES PHILLIPS.